Oct. 6, 1959

D. R. MAURE ET AL 2,907,888

FUNCTION GENERATOR

Filed March 29, 1955

Inventors:
Douglas R. Maure,
Robert W. Kettlety,
by Marlon D. Moore
Their Attorney.

United States Patent Office 2,907,888

Patented Oct. 6, 1959

2,907,888

FUNCTION GENERATOR

Douglas R. Maure, South Pasadena, Calif., and Robert W. Kettlety, Schenectady, N.Y., assignors to General Electric Company, a corporation of New York Application March 29, 1955, Serial No. 497,709

6 Claims. (Cl. 250—217)

Figures 1, 2:
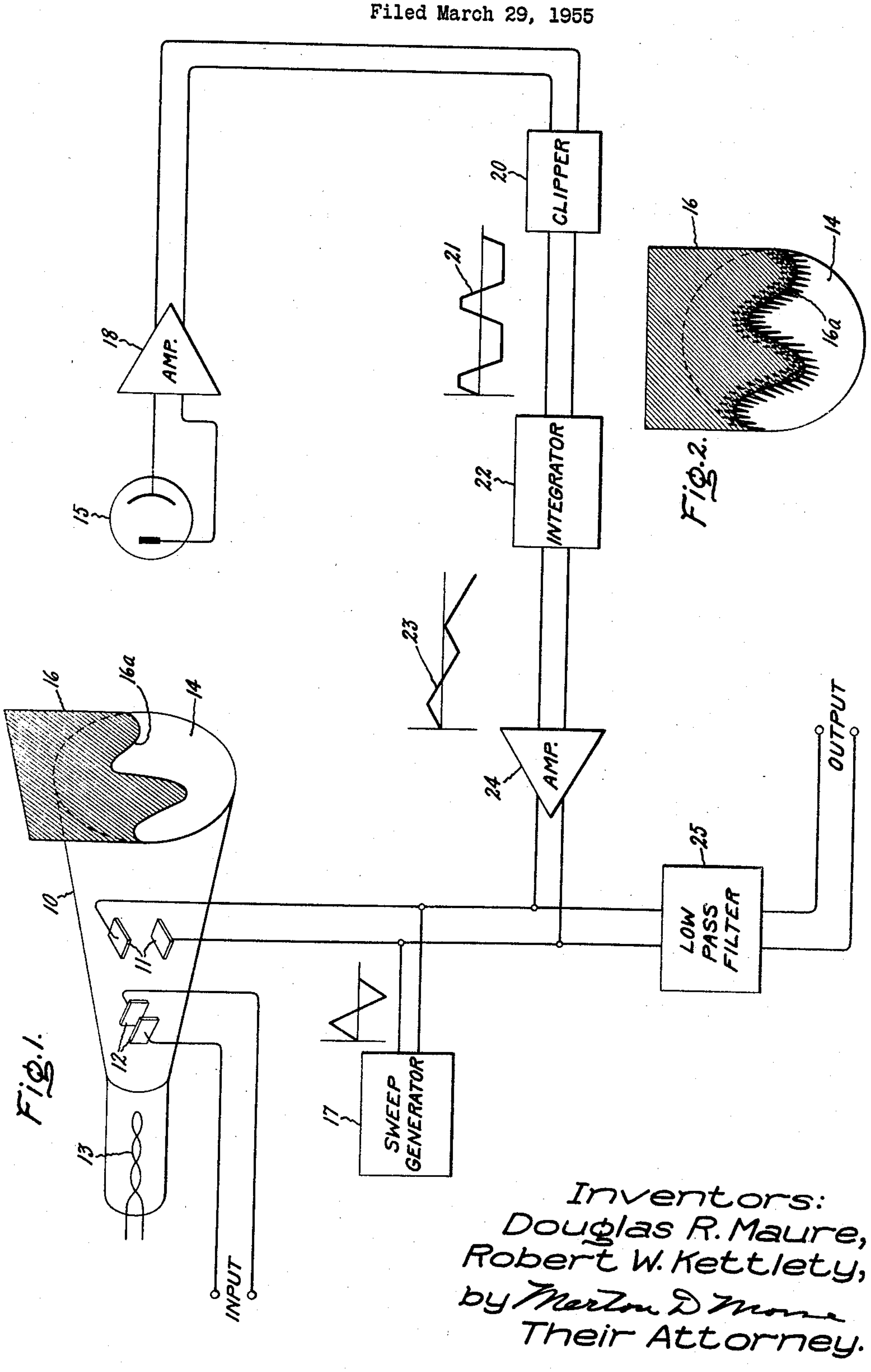

This invention relates to function generators of the analog type, and more particularly to a novel function generator of that type in which an output electrical signal varies as a function of an input electrical signal.

Function generators have been proposed in the past that employ a cathode ray tube and a mask whose edge contour represents the function to be generated. The electron beam of the cathode ray tube is made to follow the contour of the mask, and the deflection voltage of the cathode ray tube when the beam is following the mask contour is the desired output signal. An object of the present invention is to provide a high speed function generator of this general type, but one which is improved over those heretofore known in that the accuracy of the apparatus is essentially independent of variations in density and size of the electron beam of the cathode ray tube and is substantially unaffected by variations in characteristics of its other conventional well known electronic components.

A function generator constructed in accordance with the invention may comprise a conventional cathode ray tube with a light sensitive device located to receive radiation from the fluorescent screen of the cathode ray tube and connected to provide a signal when light is incident thereon. A mask is interposed between the face of the cathode ray tube and the light sensitive device, the edge of the mask having a contour representing the function to be generated with coordinates corresponding to the input and output signals. The electron beam of the cathode ray tube is caused to sweep cyclically in a direction corresponding to the output signal coordinate of the mask, and the input signal is connected to position the cyclic sweep in a direction corresponding to the input signal coordinates of the mask.

As the electron beam sweeps rapidly back and forth across the face of the cathode ray tube, positive and negative signals are derived from the output of the light sensitive device, with the relative durations of the signals being related to the length of time that light reaches the light sensitive device and hence related to the position of the electron beam sweep relative to the edge of the mask. If the center of the sweep on the cathode ray tube screen is not behind the mask, the positive output signals from the light sensitive device will be of longer duration than the negative signals. On the other hand, if the electron beam sweep is centered on the cathode ray tube screen at a point behind the mask, the negative signals from the light sensitive device will be of greater duration than the positive signals. Means are provided to integrate the signals derived from the light sensitive device to provide a signal which is connected to the cathode ray device to position the scan in the direction of the output signal coordinate. That signal also provides the output signal which varies as the desired function of the input signal.

The features of the invention which are believed to be novel are set forth with particularity in the appended claims. The invention, itself, however, both as to its organization and method of operation, together with further objects and advantages thereof, may be better understood by consideration of the following description taken in conjunction with the accompanying drawing, in which Fig. 1 is a schematic diagram of a function generator constructed in accordance with the invention; and Fig. 2 is a diagrammatic view of the mask and the face of the cathode ray tube illustrating the scanning action.

Referring to Fig. 1, the function generator of the invention comprises a conventional cathode ray tube 10 of the electrostatic deflection type having vertical deflection plates 11, horizontal deflection plates 12, an electron gun 13 and a fluorescent screen 14 that emits visible light when struck by electrons from the gun 13. If desired, a magnetic deflection type of cathode ray tube may be employed with appropriate changes in the input circuitry to provide deflection currents rather than voltages. A conventional power supply (not shown) may provide the necessary electrical power for the cathode ray tube and the other components to be later described.

A light sensitive device 15, such as a conventional photocell or photomultiplier tube, is located to receive light emitted by the fluorescent screen 14 on the face of the cathode ray tube and an opaque mask 16 is interposed between the face of the cathode ray tube and the light sensitive device 15. The contour of the edge **16*a* of the mask represents the function to be generated and has coordinates corresponding to the input and output signals. As illustrated, the input signal coordinate extends in the horizontal direction and the output signal coordinate extends in the vertical direction. Of course, the light sensitive device 15** should be shielded from stray light by suitable means (not shown).

The input signal whose function is to be generated may be connected to the horizontal deflection plates 12 of the cathode ray tube either directly or through an amplifier (not shown) to the position in a horizontal direction the electron beam emitted by the gun 13.

The electron beam of the cathode ray tube is caused to sweep cyclically in the direction corresponding to the output signal coordinates (in this case, vertically) at a relative high speed by a voltage produced by a conventional sweep voltage generator 17 and connected to the vertical deflection plates 11 of the cathode ray tube. The output voltage of the sweep generator 17 may have a sawtooth, sine wave, or other symmetrical periodically recurring waveform, and the exact shape of the waveform is of minor importance so long as the positive and negative portions of each cycle are of equal time duration. Preferably, the sweep voltage output of the generator 17 is of substantially constant amplitude and has a substantially constant frequency considerably higher that the maximum frequency of the input voltage. For example, if the maximum frequency of the input voltage is 100 cps., the frequency of the sweep voltage may be of the order of 50,000 cps. Of course, these values are in no sense limiting.

As shown diagrammatically in Fig. 2, the electron beam of the cathode ray tube 10 sweeps rapidly up and down and across the fluorescent screen 14 of the tube. Thus, light from the screen reaches the light sensitive device 15 during a portion of each scanning cycle and is cut off during the remaining portion of each scanning cycle by the opaque mask 16 interposed between the face of the cathode ray tube and the light sensitive device. Of course, if the high frequency sweep is of insufficient amplitude and is centered too far above or below the edge **16*a* of the mask, light either reaches the light sensitive device 15** during the complete scanning cycle or does not reach the light sensitive device at any time during the scanning cycle. It is assumed for purposes of explanation, that the center of the sweep is sufficiently close to the edge 16a of the mask and the amplitude of the sweep is sufficiently great to permit light from the screen to reach the light sensitive device 15 during a portion of each scanning cycle. However, as will become apparent later, if the sweep is not so positioned, the action of the apparatus is to correct the position of the sweep so that light does reach the light sensitive device during a portion of each sweep cycle.

Referring again to Fig. 1, when light from the fluorescent screen 14 of the cathode ray tube reaches the light sensitive device 15, a signal is produced by the device and is amplified by a conventional A.C. amplifier 18. The output of amplifier 18 is an alternating current signal of substantially rectangular wave shape, with the duration of the negative portion of each cycle representing the length of time during each scanning cycle that light from the cathode ray tube screen is incident on the light sensitive device, and the duration of the positive portion of each cycle representing the time during each scanning cycle that light from the cathode ray tube screen is prevented from reaching the light sensitive device by the opaque mask 16.

Variations in density of the electron beam of the cathode ray tube 10 or changes in characteristics of the light sensitive device 15 or amplifier 18 may cause changes in the amplitude of the output signal from the amplifier 18. Therefore, in order to insure that all signals have the same amplitude, the output of the amplifier 18 may be connected into a conventional electronic clipper 20 to limit the amplitudes of all signals to a predetermined level. The output of the clipper 20, when the high speed vertical sweep of the electron beam of the cathode ray device is centered at the edge 16a of the mask, is essentially a square wave having positive and negative portions of equal amplitude and equal time duration. However, if the sweep is centered below the edge 16a of the mask, the output of the clipper 20 may have a wave form such as represented by curve 21, in which the negative portion of each cycle is of longer time duration than the positive portion, although the two portions have equal amplitudes of opposite polarity. Conversely, if the high speed vertical sweep is centered above the edge 16a of the mask (behind the mask) the positive portion of the output wave from the clipper 20 will be of longer time durations than the negative portion.

The output of clipper 20 is connected to the input of a conventional electronic integrator 22. The output of integrator 22 is a direct voltage, which is constant when the output wave form of the clipper 20 has positive and negative portions of equal time duration, and which becomes increasingly positive or negative as the positive and negative portions of the clipper output wave form differ from each other in time duration. The output of the integrator 22 when the negative portions of the clipper output wave form is of longer time duration than the positive portions is illustrated by curve 23. The output of the integrator 22 may be amplified and inverted by a conventional D.C. amplifier 24, whose output is connected to the vertical deflection plates 11 of the cathode ray tube 10 in order to center the vertical scan on the edge of the contour mask 14.

It is now apparent that the output voltage of the amplifier 24 varies as a function of the input voltage in accordance with the contour of the mask 16, and may provide the output voltage from the function generator. Because the outputs of the amplifier 24 and the high speed sweep generator 17 are connected together, it is necessary to obtain the desired output voltage from the output of amplifier 24 through a conventional low pass filter 25, which will not pass the A.C. output of sweep generator 17.

If, when starting operation of the function generator, the high speed sweep is centered so that light reaches or is cut off from the light sensitive device during the complete scanning cycles, the device automatically positions the sweep in its proper place centered at the edge of the mask. That action occurs because the output of integrator 22, when its input is a constant positive or negative signal, is an increasingly positive or increasingly negative signal. The increasingly positive or negative signal causes the high speed sweep to be positioned upwardly or downwardly on the cathode ray tube screen until it is centered at the edge of the mask and operation continues in the manner previously described.

It is seen that apparatus constructed in accordance with the invention fulfills the objectives set forth and provides a device having several outstanding features. The function generator acts in accordance with well known null-seeking servo principles to provide a device that is characterized by high speed operation. Any deviation of the midpoint or center of the high speed scan from a point at the edge of the mask representing the function to be generated immediately produces a change in the output of the integrator 22. Thus the output signal varies as the desired function of the input signal with practically instantaneous response to a change in the input signal. The accuracy of the apparatus is unaffected by variations in the density of the cathode ray tube electron beam or variations in the amplitudes of the signals produced by the light sensitive device 15 or the amplifier 18, because all signals are limited to the same amplitude by the clipper 20. Thus, time duration is the controlling variable rather than signal amplitude.

With the exception of the mask 16, the apparatus is completely electronic in character, and all of the components are conventional, well known electronic devices.

While a particular embodiment of the invention has been illustrated, it will, of course, be understood that the invention is not limited thereto, since various modifications may be made. It is contemplated by the appended claims to cover any such modifications as fall within the true spirit and scope of the invention.

What we claim as new and desire to secure by Letters Patent of the United States is:

1. A function generator for providing an output signal that varies as a function of an input signal comprising means for producing radiation, radiation sensitive means positioned to receive said radiation for providing an output in response thereto, a mask interposed between said radiation producing means and said radiation sensitive means and having a contour representing said function, means for causing said radiation to sweep cyclically in a direction corresponding to the output signal coordinate of said mask with a substantially constant amplitude, means connected to receive said input signal for controlling the location of said cyclic sweep in a direction corresponding to the input signal coordinate of said mask, means for integrating the output from said radiation responsive device to produce said output signal, and means connecting said output signal to said first mentioned radiation sweep means to position said cyclic sweep in a direction corresponding to said output signal coordinate of said mask.

2. A function generator for providing an output signal that varies as a function of an input signal comprising means for producing radiation, a mask located in the path of said radiation and having a contour representing said function, means for causing said radiation to sweep cyclically in a direction corresponding to the output signal coordinate of said mask with a substantially constant amplitude, means connected to receive said input signal for controlling the location of said cyclic sweep in a direction corresponding to the input signal coordinate of said mask, means for producing a signal of one polarity while said radiation passes said mask and a signal of opposite polarity while said radiation is intercepted by said mask, means for integrating said signals of opposite polarity to produce said output signal, and means connecting said output signal to said first mentioned radiation sweep means to position said cyclic sweep in a direction corresponding to said output signal coordinate of said mask.

3. A function generator for providing an output signal that varies as a function of an input signal comprising a cathode ray tube having an electron beam, means for deflecting said beam, and a fluorescent screen, light sensitive means positioned to receive light from said fluorescent screen for providing an output in response thereto, a mask interposed between said fluorescent screen and said light sensitive means and having a contour representing said function, means connected to said beam deflecting means for causing said beam to sweep cyclically in a direction corresponding to the output signal coordinate of said mask with a substantially constant amplitude, means connecting said input signal to said beam deflecting means for controlling the position of said sweep in a direction corresponding to the input signal coordinate of said mask, means for integrating said output from said light sensitive means to produce said output signal, and means connecting said output signal to said beam deflecting means to position said cyclic sweep in a direction corresponding to said output signal coordinate of said mask.

4. A function generator for providing an output electrical signal that varies as a function of an input electrical signal comprising a cathode ray device having an electron beam, means for deflecting said beam, and a fluorescent screen, light sensitive means positioned to receive light from said fluorescent screen for providing an electrical output in response thereto, a mask interposed between said fluorescent screen and said light sensitive means and having a contour representing said function, electrical means connected to said beam deflecting means for causing said beam to sweep cyclically with a substantially constant amplitude, in a direction corresponding to the output signal coordinate of said mask, means connecting said input signal to said beam deflecting means for controlling the position of said sweep in a direction corresponding to the input signal coordinate of said mask, means responsive to the electrical output from said light sensitive means for providing electrical signals of opposite polarity corresponding in time duration to incidence and non-incidence of light on said light sensitive means, means for integrating said signals of opposite polarity to produce said output electrical signal, and means connecting said output electrical signal to said beam deflecting means to position said cyclic sweep in a direction corresponding to said output signal coordinate of said mask.

5. A function generator for providing an output electrical signal that varies as a function of an input electrical signal comprising a cathode ray device having an electron beam, means for deflecting said beam, and a fluorescent screen, light sensitive means positioned to receive light from said fluorescent screen for providing an electrical output in response thereto, a mask interposed between said fluorescent screen and said light sensitive means and having a contour representing said function, electrical means connected to said beam deflecting means for causing said beam to sweep cyclically with a substantially constant amplitude in a direction corresponding to the output signal coordinate of said mask, means connecting said input signal to said beam deflecting means for controlling the position of said sweep in a direction corresponding to the input signal coordinate of said mask, means connected to receive the electrical output from said light sensitive means for providing electrical signals of opposite polarity corresponding in time duration of incidence and non-incidence of light on said light sensitive means, means connected to receive said signals of opposite polarity for limiting the amplitudes thereof to a constant level, means connected to receive said constant amplitude positive and negative signals for integrating them to produce said output electrical signal, and means connecting said output electrical signal to said beam deflecting means to position said cyclic sweep in a direction corresponding to said output signal coordinate of said mask.

6. A function generator for providing an output electrical signal that varies as a function of an input electrical signal comprising a cathode ray device having an electron beam, means for deflecting said beam, and a fluorescent screen, light sensitive means positioned to receive light from said fluorescent screen for providing an electrical output in response thereto, a mask interposed between said fluorescent screen and said light sensitive means and having a contour representing said function with coordinates corresponding to said input and output signals, electrical means connected to said beam deflecting means for causing said beam to sweep cyclically with a substantially constant amplitude in a direction corresponding to said output signal coordinate of said mask, means connecting said input signal to said beam deflecting means for controlling the position of said sweep in a direction corresponding to said input signal coordinate of said mask, means connected to receive the electrical output from said light sensitive means for providing electrical signals of opposite polarity corresponding in time duration to the time duration of incidence and non-incidence of light on said light sensitive means, means connected to receive said signals of opposite polarity for limiting the amplitudes thereof to a constant level, means connected to receive said constant amplitude positive and negative signals for integrating them to produce said output electrical signal, means connecting said output electrical signal to said beam deflecting means to position said cyclic sweep in a direction corresponding to said output signal coordinate of said mask, and filter means connected to said beam deflecting means for providing said output electrical signal.

References Cited in the file of this patent

UNITED STATES PATENTS

| | | |
|---|---|---|
| 2,462,263 | Haynes | Feb. 22, 1949 |
| 2,528,020 | Sunstein | Oct. 31, 1950 |
| 2,575,445 | Germer | Nov. 20, 1951 |
| 2,656,101 | Haviland | Oct. 20, 1953 |
| 2,734,137 | Patterson | Feb. 7, 1956 |